(12) United States Patent
Lin

(10) Patent No.: US 6,948,253 B1
(45) Date of Patent: Sep. 27, 2005

(54) PLUMB-BOB

(75) Inventor: Ming-Cheng Lin, Taipei (TW)

(73) Assignee: Clear Dawn Co., LTD, Taipei (TW)

( * ) Notice: Subject to any disclaimer, the term of this patent is extended or adjusted under 35 U.S.C. 154(b) by 0 days.

(21) Appl. No.: 10/829,965

(22) Filed: Apr. 23, 2004

(51) Int. Cl.⁷ ............................................. G01C 15/10

(52) U.S. Cl. ......................................................... 33/392

(58) Field of Search ................................... 33/391–402

(56) References Cited

U.S. PATENT DOCUMENTS

| | | | | |
|---|---|---|---|---|
| 267,655 | A | * | 11/1882 | Vajen ............................ 33/392 |
| 409,917 | A | * | 8/1889 | Cameron ...................... 33/392 |
| 485,376 | A | * | 11/1892 | Fuller ........................... 33/392 |
| 630,262 | A | * | 8/1899 | Nacke ........................... 33/392 |
| 2,381,698 | A | * | 8/1945 | Sireci ........................... 33/392 |
| 2,492,884 | A | * | 12/1949 | Patermaster ................. 33/392 |
| 3,113,387 | A | * | 12/1963 | Bean, Jr. ...................... 33/392 |
| 3,720,001 | A | * | 3/1973 | Majewski ..................... 33/392 |
| 4,625,428 | A | * | 12/1986 | Griffin .......................... 33/392 |
| 5,157,843 | A | * | 10/1992 | Barcewski .................... 33/392 |
| 5,720,112 | A | * | 2/1998 | Adams et al. ................. 33/391 |
| 6,397,484 | B1 | * | 6/2002 | Greene ......................... 33/392 |

OTHER PUBLICATIONS

Webpage: http://www.brightlingsbeads.com/sprinfinclas.html , copyright Jan. 1, 2005.*

* cited by examiner

Primary Examiner—G. Bradley Bennett
(74) Attorney, Agent, or Firm—Troxell Law Office, PLLC

(57) ABSTRACT

The improved plumb-bob is mainly consisted of a body section, a point section, and a fixing element, wherein a connecting means is arranged at the top of the body section by which it may be connected to a suspending cord, and the point section is a cylinder with a flange arranged at the shank, and the point section is provided at least at one end with a conical-pointed part, and the fixing element is bored from the low end to the upper end forming an upper portion and a lower portion. The upper portion is of larger diameter and the lower portion is of reduced diameter but is larger than that of the point section, thus forming an angular shoulder against which the fringe abuts when the parts are assembled to enable the conical-pointed part to project outwardly under the fixing element. The fixing element can hold and fix the point section in a proper position between the body and the fixing element. The invention may simplify the structure of the expandable point section such that not only the manufacturing cost of the point section is reduced, but also many unnecessary compatible constraints may be removed, that is, when the point section is damaged and no spared point section for replacement, a metal nail, such as iron nail, steel nail, etc., with similar diameter can be applied as a substitute.

9 Claims, 7 Drawing Sheets

PLUMB-BOB

1. Field of the Invention

The invention relates to an improved plumb-bob, and more particularly, to an improved plumb-bob having advantages as following: easy to carry and safekeeping, easy to get the replacement for the expandable point, and low cost.

2. Background of the Invention

Generally, when a construction is underway, no matter bricklayers or other artisans must use certain auxiliary tools to help measuring or marking a level. Plumb-bob is the most commonly used tool for the jobs. The outer appearance of a conventional Plumb-bob A, as shown in FIG. 1, is a cone shape, and at the top thereof has means B by which it may be connected to a suspending cord C. By holding the suspending cord C, the plumb-bob A can be dropped and hanged due to gravity. When the plumb-bob A is still, a level can be marked by the tapered point of the plumb-bob. However, any careless contact between the point and the ground or other hard surface during the operation will dull or skew the point such that the vertical level can not be marked correctly and thus the plumb-bob with dulled and skewed point should be replaced by a new one. Therefore, the U.S. Pat. No. 1,596,882 provides a plumb-bob with interchangeable point section. The plumb-bob comprises a body section D and a point section E as shown in FIG. 2A. The body section D is tapered in conformity with ordinary practice, and at the top has means F by which it may be connected to a suspending cord. The body section is truncated at the lower end and centrally chambered from the bottom. The outer portion of the chamber G is internally threaded to take the threaded portion H of the point section E, by which the point section E can be removed from or screwed in the body section D. In practice, when the plumb-bob is to be used it is assembled as shown in FIG. 2A. When the point section E is damaged by careless operation, the user may simply replace the damaged point section with a new one and the work can continue. Usually, a replacement point section I is attached in the package as shown in FIG. 2B. However, the package of FIG. 2B is not only inconvenient for the user to carry the replacement point I and easy to lose it, but also it is a tough job to properly keep the replacement point I from damaging by any careless contacting. In addition, The point section E with threaded potion H is costly to make and is difficult to find a substitute for the same after the original point E is damaged, since the diameter and thread pitch of the threaded portion H of the point section E has to match with those of the threaded portion of the chamber G. The shortcoming of uneasy to purchase the substitute is also true for the plumb-bob disclosed in the U.S. Pat. No. 3,448,525.

The U.S. Pat. No. 409,917 has disclosed a point section J having dual points as seen in FIG. 3, wherein a spring-ring L, whose internal diameter is made a little less than the diameter of the point section J, is adapted to bind the point section J and hold it in a proper position against the body K. Since the point J having smooth surface is held completely by the friction provided by the spring-ring L, not only the clamping is not solid, i.e. easy to loosen and cause the point to drop off, but also a strong friction generated between the point J and the spring-ring L during either withdrawing or inserting the point J will wear down the spring-ring L and worsen the holding effect which might cause the dropping of the point J even during operation. When the point J and the spring-ring L are damaged and are required to be changed, the user will face the same problem as described above.

SUMMARY OF THE INVENTION

The primary object of the invention is to provide an improved plumb-bob, which is mainly consisted of a body section, a point section, and a fixing element, wherein a connecting means is arranged at the top of the body section by which it may be connected to a suspending cord, and the fixing element has an accommodating space arranged therein to be adapted for accommodating the point section, in addition, the fixing element is connected to the body section by a connecting mechanism capable of fixing the point section and place the point section ion a proper position against the body section, such that the point of the point section is projected outwardly under the fixing element. By simplifying the structure of the point section, not only it is possible to lower the manufacturing cost, but also enable users to obtain a substitute of the same function as the expandable point section easily and conveniently.

The secondary objective of the invention is to provide an improved plumb-bob with dual-point. With the dual-point design of the present invention, the body section is truncated at the lower end and centrally chambered from the bottom to form a chamber for accommodating an unused point of the point section. In this regard, the unused point of the point section is able to have a better protection comparing with the prior art by safekeeping the same in the foregoing chamber. Therefore, the present invention has the advantage of easy storage without considering the damage caused by collision.

Another object of the invention is to provide an improved plumb-bob, wherein the fixing element further comprising at least one via hole arranged thereon. By arranging such via hole, the user may insert and rotate a bar tool in the via hole so as to fixing/releasing the fixing element from the body section.

Yet, another object of the invention is to provide an improved plumb-bob, further comprising a spring-ring arranged between the point section and the fixing element. By means of the constraint force provided by the spring-ring, not only it is possible to provide the point section with an excellent fixing and holding effect, but also the resilience provided by the same may indeed prevent the assembly from loosing.

Following drawings are cooperated to describe the detailed structure and its connective relationship according to the invention for facilitating your esteemed members of reviewing committee in understanding the characteristics and the objectives of the invention.

DETAILED DESCRIPTION OF THE INVENTION

Figure 1:
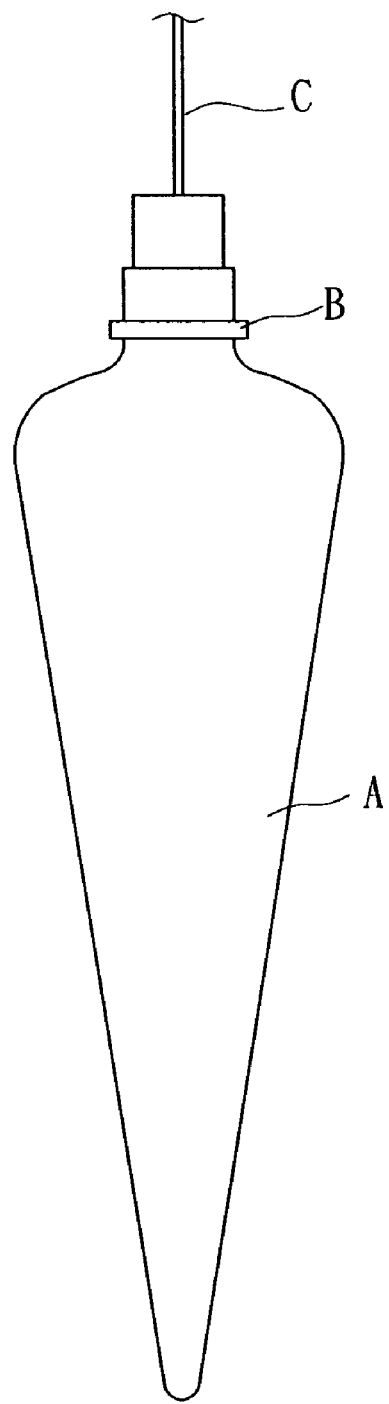
FIG. 1 is an outer appearance of a conventional plumb-bob.
Figure 2A:
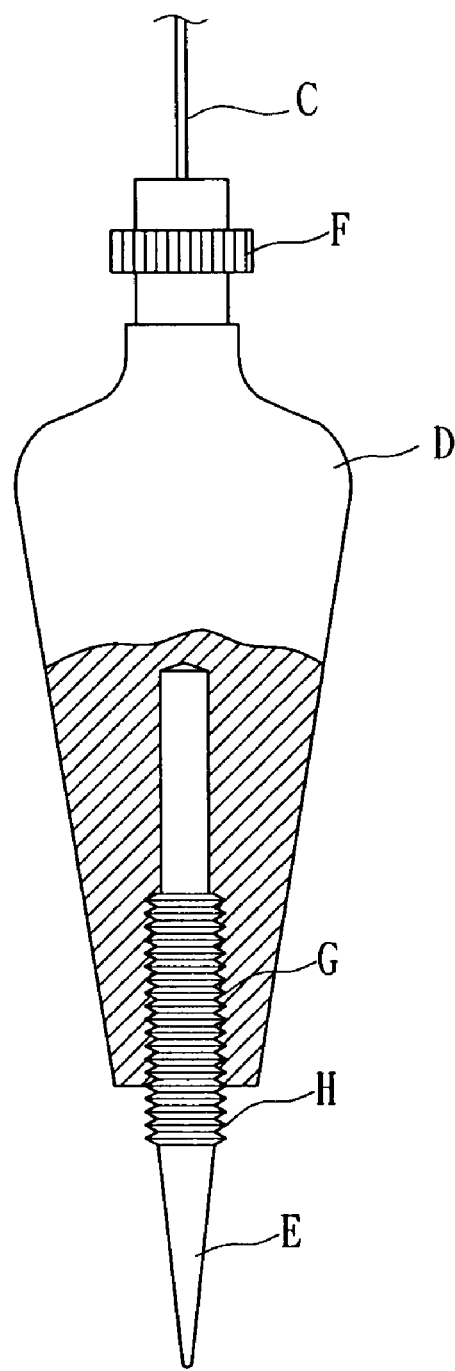
FIG. 2A is a partial cross-sectional view of a plumb-bob shown in U.S. Pat. No. 1,596,882.
Figure 2B:
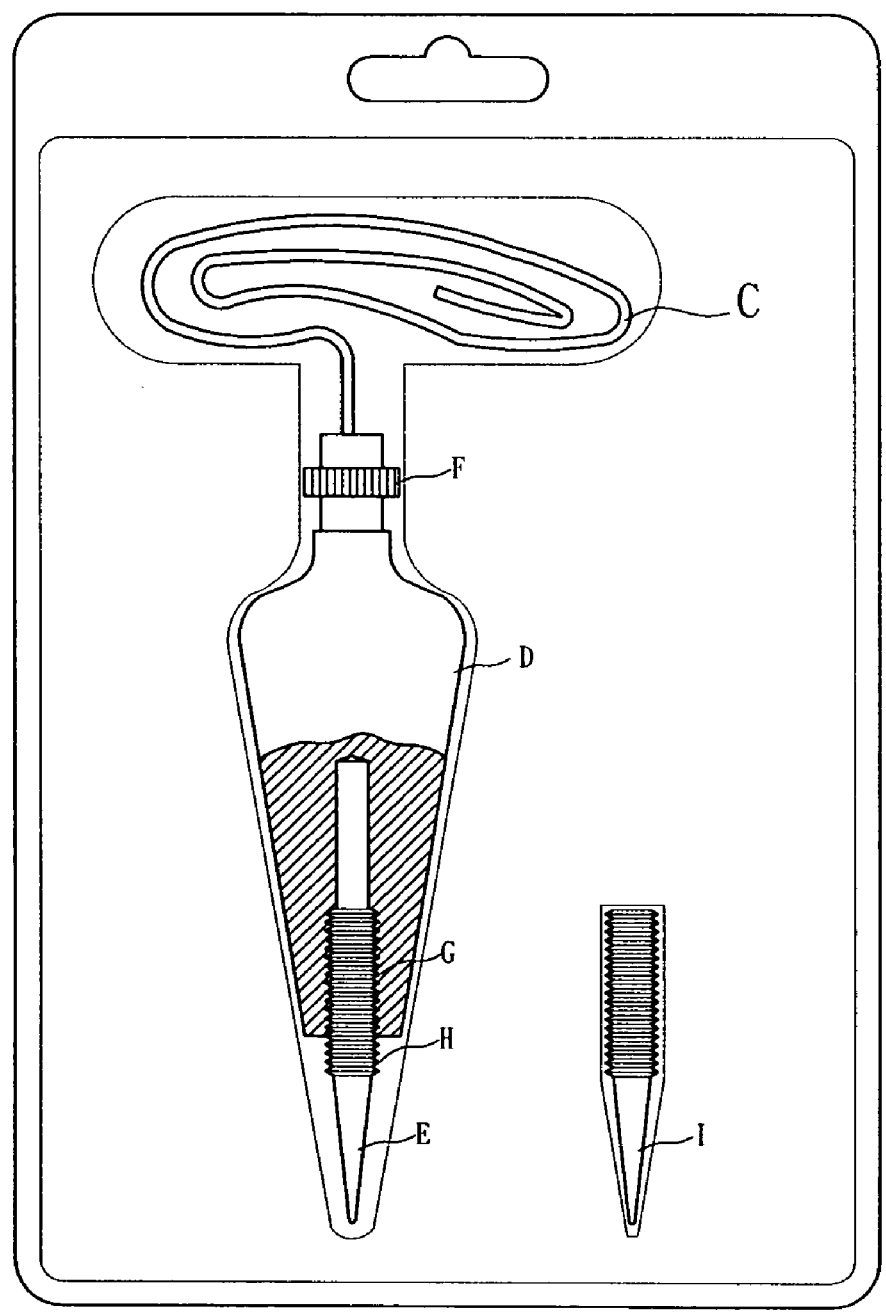
FIG. 2B is an outer appearance illustration of the package of the U.S. Pat. No. 1,596,882.
Figure 3:
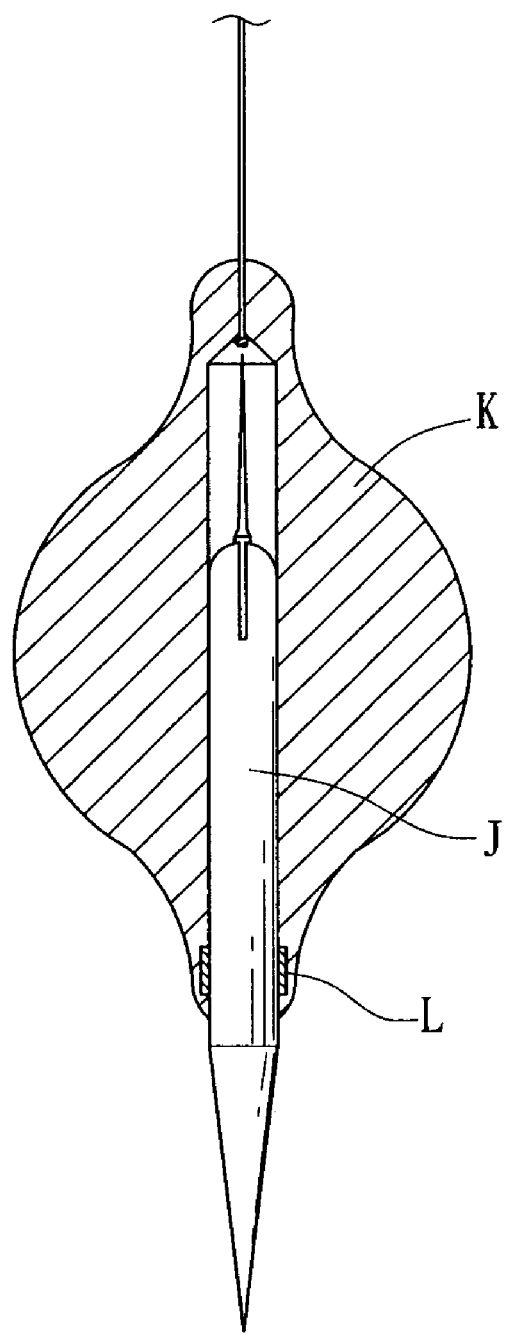
FIG. 3 is a cross-sectional view of a plumb-bob shown in U.S. Pat. No. 409,917.
Figure 4:
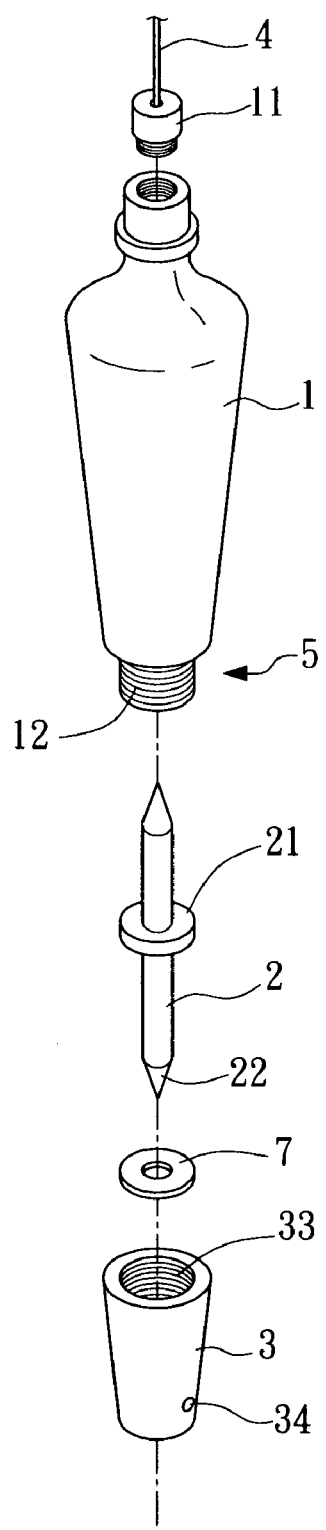
FIG. 4 is a 3-D explosive view of the present invention.
Figure 5:
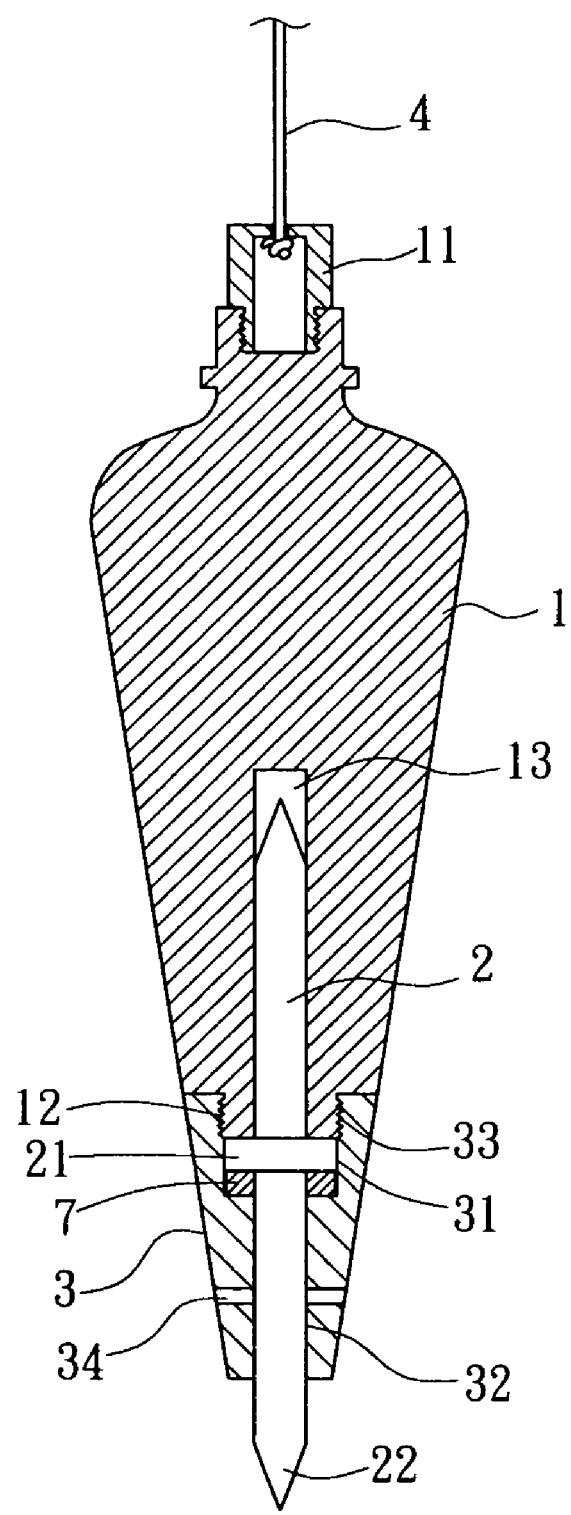
FIG. 5 is a cross-sectional view showing an assembly of the present invention.
Figure 6:
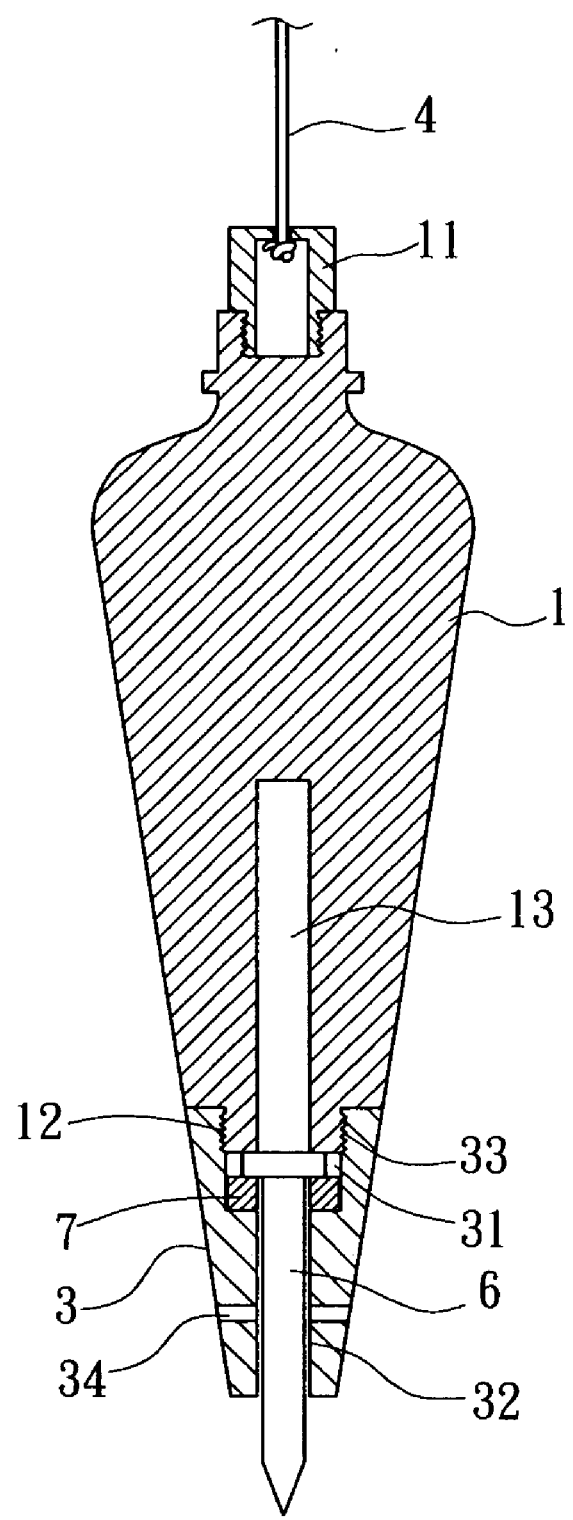
FIG. 6 is a cross-sectional diagram showing a metal nail being used as substitute of the point section according to the present invention.

Please refer to FIG. 4 and FIG. 5, which are the 3-D explosive view and the cross-sectional view of an assembled plumb-bob of the present invention. The improved plumb-bob disclosed by the invention is mainly consisted of a body section 1, a point section 2, and a fixing element 3, wherein a connecting means 11 is arranged at the top of the body section 1 by which it may be connected to a suspending cord 4, and the point section 2 is a cylinder with a flange 21 arranged at the shank thereof, and the point section 2 is provided at least at one end with a conical-pointed part 22, and the fixing element is bored from the low end to the upper end forming an upper portion 31 and a lower portion 32. The upper portion 31 is of larger diameter and the lower portion 32 is of reduced diameter but is larger than that of the point section 2, thus forming an angular shoulder against which the fringe 21 abuts when the parts are assembled to enable the conical-pointed part 21 to project outwardly under the fixing element 3. Furthermore, a connecting mechanism 5 is applied for assembling the body 1 and the fixing element 3. The fixing element 3 can hold and fix the point section 2 in a proper position between the body 1 and the fixing element 3. By means of aforementioned structure, the invention may simplify the structure of the expandable point section 2 such that not only the manufacturing cost of the point section 2 is reduced, but also many unnecessary compatible constraints may be removed, that is, when the point section 2 is damaged and no spared point section 2 for replacement, a metal nail 6, such as iron nail, steel nail, etc., with similar diameter can be applied as a substitute. Since it is easy to have access to a metal nail 6 and the price thereof is relatively cheap, the plumb-bob of the present invention has excellent practicability.

The connecting mechanism 5 connecting the body 1 and the fixing element 3 may be any conventional connecting mechanism. In a preferred embodiment, the top part 33 of the upper portion 31 is internally threaded to take the threaded part 12 of the body section 1. The thread-and-screw method disclosed in the invention is just one kind of many embodiments for assembling the body section 1 and the point section 2.

As seen in FIG. 5, the body section is truncated at the lower end and centrally chambered from the bottom so as to form a chamber 13 for accommodating an point of the point section 2 since the point section 2 of the present invention has a dual-point design. In this regard, the unused point of the point section is able to have a better protection comparing with the prior art by safekeeping the same in the foregoing chamber. Therefore, the present invention has the advantage of easy storage without considering the damage caused by collision.

Moreover, the plumb-bob of the present invention further comprises a washer 7 arranged between the point section 2 and the fixing element 3, whose internal diameter is made a little less than the diameter of the point section 2. The constraining force provided by the washer 7 can bind the point section 2 and hold it in a proper position against the body 1, even when a metal nail 6 with diameter different than that of the point section is used as a substitute, the washer 7 is still capable of holding and fixing the metal nail in a desirable position. By means of the constraint force provided by the washer 7, not only it is possible to provide the point section 2 with an excellent fixing and holding effect, but also the resilience provided by the same may indeed prevent the assembly from loosing.

Furthermore, the fixing element 3 further comprising at least one via hole 34 arranged thereon. By arranging such via hole, the user may insert and rotate a bar tool in the via hole 34 so as to fixing/releasing the fixing element from the body section.

From the description above, the plumb-bob of the present invention is easy to carry and the spared point section can be saved in the chamber therein without considering the damage of external collision and the danger of lost. By arranging the fixing element in the structure of the invention, the structure of the point is simplified. Not only it is possible to obtain a more secure fixing function, but also it is more easy for the user to obtain a substitute of the same function to replace the expandable point section. In this regard, the plumb-bob of the present invention has excellent practicability.

What is claimed is:

1. A plumb-bob comprising:
   a) a body section having a connecting device removably connected to a first end thereof;
   b) a fixing element having:
      i) an upper bored portion on a first fixing end; and
      ii) a lower bored portion on a second fixing end communicating with the upper bored portion, the upper bored portion having a diameter that is larger than a diameter of the lower bored portion; and
   c) a point section having:
      i) a shank;
      ii) a flange located on the shank; and
      iii) at least one conical pointed section located on an end of the shank,
   wherein a second end of the body section is threadedly connected to the first fixing end of the fixing element; the shank is inserted through the upper bored portion and the lower bored portion, the flange being located in the upper bored portion and selectively fixed between the body section and the fixing element, a first conical pointed section of the at least one conical pointed section protruding downwardly from the second fixing end of the fixing element.

2. The plumb-bob according to claim 1, further comprising a washer located in the upper bored portion, the shank is inserted through a hole in the washer.

3. The plumb-bob according to claim 1, wherein the at least one conical pointed section of the a point section includes the first conical pointed section and a second conical pointed section located at opposing ends of the shank, the body section includes a chamber located in the second end thereof, and the second conical pointed section is inserted into the chamber.

4. The plumb-bob according to claim 1, wherein the point section is a nail.

5. The plumb-bob according to claim 1, wherein the second end of the body section has external threads, and the first fixing end of the fixing element has internal threads selectively engaging the external threads.

6. The plumb-bob according to claim 1, wherein the connecting device is threadedly connected to the body section.

7. The plumb-bob according to claim 1, wherein the connecting device includes a hole in a top thereof, the cord is inserted through the hole.

8. The plumb-bob according to claim 1, further comprising a cord connected to the connecting device.

9. The plumb-bob according to claim 1, wherein the fixing element includes at least one via hole.

* * * * *